No. 758,278. PATENTED APR. 26, 1904.
W. M. RAPP.
PIPE JOINT.
APPLICATION FILED OCT. 31, 1901.
NO MODEL.

No. 758,278.

Patented April 26, 1904.

UNITED STATES PATENT OFFICE.

WILLIAM M. RAPP, OF ATLANTA, GEORGIA.

PIPE-JOINT.

SPECIFICATION forming part of Letters Patent No. 758,278, dated April 26, 1904.

Application filed October 31, 1901. Serial No. 80,595. (No model.)

*To all whom it may concern:*

Be it known that I, WILLIAM M. RAPP, a citizen of the United States, residing at Atlanta, county of Fulton, and State of Georgia, have invented certain new and useful Improvements in Pipe-Joints, fully described and represented in the following specification and the accompanying drawings, forming a part of the same.

This invention relates to pipe-joints, the improvements of the present invention having reference particularly to pipe-joints of that class in which the end of one of the two members to be joined, consisting of two pipes or a pipe and plug, is inserted in the end (usually bell-shaped) of the other member, the space between the two overlapping ends being then suitably packed to form a tight joint.

The object of the present invention is to provide a joint of this character whereby a tight and firm closure between the ends of the pipes or the pipe and plug may be effected and whereby also the member which is inserted in the end of the other member may be readily withdrawn when desired for the purpose of permitting repairs or inspection and may be as readily returned to position after such repairs or inspection without affecting in any way the firmness or tightness of the joint between the two members.

The improvements of the present invention are of particular advantage where it is desired to form joints between or plug the ends of pipes under water.

The invention also relates to a peculiar construction of plug used for plugging the end of a pipe or fitting and designed to be secured therein according to the present invention.

As a full understanding of the invention can best be had by a detailed description of an organization embodying the same, such description will now be given, reference being had to the accompanying drawings, in which—

Figure 1:
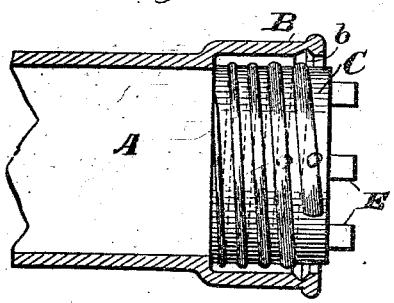
Figure 2:
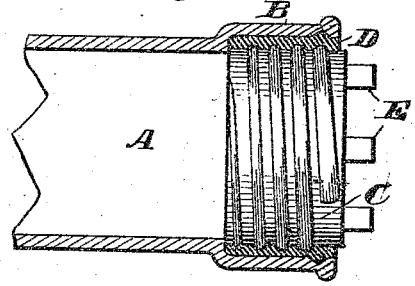
Figure 3:
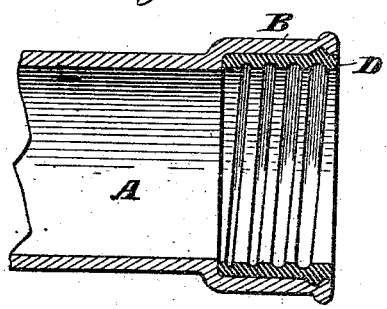
Figure 4:
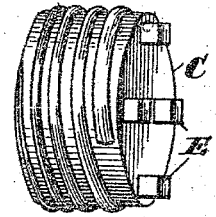
Figure 5:
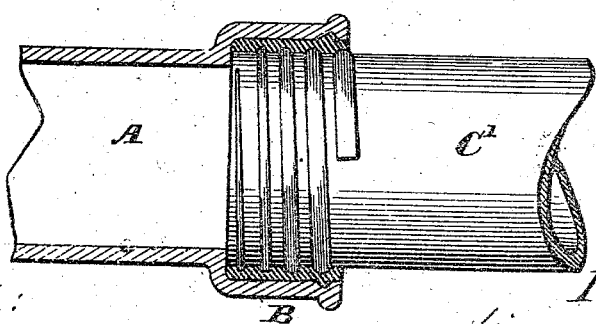

Figure 1 is a longitudinal sectional elevation of a pipe with a plug in the end thereof ready for the formation of the joint between it and the pipe. Fig. 2 is a similar view showing the joint formed between the plug and pipe. Fig. 3 is a view corresponding to Fig. 2, but with the plug withdrawn. Fig. 4 is a perspective view of the plug. Fig. 5 is a view similar to Fig. 2, illustrating the present invention applied to the meeting ends of two adjacent pipes or sections of piping.

Referring to Figs. 1 to 4 of the drawings, A represents an ordinary water or other pipe or fitting provided with the usual bell-shaped end B for the reception of a plug C for closing the end of said pipe or for the reception of another pipe or section of piping. (See Fig. 5.) The plug C is screw-threaded, as shown, the thread thereon tapering toward the inner end of the plug for a purpose to be hereinafter explained. In plugging the end of the pipe A with the plug C the latter is first inserted in the bell-shaped end B of the pipe, as shown in Fig. 1, molten lead or other suitable material being then poured into the space between the inner face of said bell-shaped end B and the plug C, so as to form a filling or packing D molded into the space between the plug C and bell B and about the screw-thread upon said plug and which keys into a recess *b* in the end of the pipe. The lead or other suitable filling material being then allowed to cool and then calked, because of shrinkage as it cools, will form a firm and tight joint between the plug and the pipe, effecting a perfect closure or plugging of the latter. As the filling D is introduced between the plug and pipe the thread on the former will become embedded therein, thus securely locking the plug against displacement or ejection from the pipe by the pressure within the latter. By the provision of the thread upon the plug, however, and the employment of a soft-metal packing, such as lead or other suitable soft metal, the joint formed is such as will permit of the ready removal of the plug when desired by simply turning the plug and its equally ready return to the pipe without disturbing the packing or otherwise affecting the tightness of the joint between the plug and pipe. As the plug is turned to remove it from the pipe the thread thereon will move through the packing, leaving a female screw-thread therein, as shown in Fig. 3, ready for its reception on its return to the pipe. The thread upon the plug tapers toward the inner end thereof, as with such a thread the plug can be more readily removed, and, moreover, upon the return of the plug a wedging action is secured between the thread thereon and that in the packing, insuring a tight joint between the two. For convenience in turning the plug is, as shown, provided with a number of projections E, adapted for engagement by a suitable wrench or turning-key.

The present invention has been designed with especial reference to joints formed between a pipe and a plug in the end thereof; but it is equally applicable to joints between the ends of two pipes or sections of piping. Such a construction is shown in Fig. 5, wherein A C' represent two pipes, with the latter inserted in the end of the former and the joint formed between the two, as just described in connection with the plug of Figs. 1 to 4.

What I claim is—

1. The combination of a pipe, a member provided on its end with an exterior screw-thread which tapers inwardly, and a packing of lead or other suitable material molded between said pipe and member and about the screw-thread upon the latter, substantially as described.

2. The combination of a pipe, a plug in the end thereof provided with an exterior screw-thread which tapers inwardly, and a packing of lead or other suitable material molded between said pipe and plug and about the screw-thread upon the latter, substantially as described.

3. The combination of a pipe, a member provided on its end with an exterior screw-thread which tapers inwardly, and a packing of lead or other suitable material molded between said pipe and member and about the screw-thread upon the latter, said pipe being provided with a recess B into which said packing keys, substantially as described.

4. The combination of a pipe, a plug in the end thereof provided with an exterior screw-thread which tapers inwardly, and a packing of lead or other suitable material molded between said pipe and plug and about the screw-thread upon the latter, said pipe being provided with a recess B into which said packing keys, substantially as described.

5. A plug, as C, provided with an exterior screw-thread which tapers inwardly, substantially as described.

6. A plug, as C, provided with an exterior screw-thread which tapers inwardly, and with means, as E, for engagement by a wrench or the like, substantially as described.

In testimony whereof I have hereunto set my hand in the presence of two subscribing witnesses.

W. M. RAPP.

Witnesses:
PARK WOODWARD,
H. M. LOFLOSS.